(12) United States Patent
Wolfe et al.

(10) Patent No.: US 9,611,101 B1
(45) Date of Patent: Apr. 4, 2017

(54) RETURN BELT TRACKING IDLER FOR CONVEYOR BELT SYSTEM

(71) Applicant: Richwood Industries Inc., Huntington, WV (US)

(72) Inventors: Caleb Wolfe, Southpoint, OH (US); Glenn E Farrow, Barboursville, WV (US); Christopher S Smith, Huntington, WV (US)

( * ) Notice: Subject to any disclaimer, the term of this patent is extended or adjusted under 35 U.S.C. 154(b) by 0 days.

(21) Appl. No.: 15/052,824

(22) Filed: Feb. 24, 2016

Related U.S. Application Data

(60) Provisional application No. 62/258,822, filed on Nov. 23, 2015.

(51) Int. Cl.
*B65G 39/16* (2006.01)

(52) U.S. Cl.
CPC .... *B65G 39/16* (2013.01); *B65G 2812/02168* (2013.01)

(58) Field of Classification Search
CPC ............... B65G 39/16; B65G 2812/02168
USPC ........ 198/808, 806, 824–830, 837, 840, 842
See application file for complete search history.

(56) References Cited

U.S. PATENT DOCUMENTS

| 1,773,621 | A | * | 8/1930 | Hopkinson | ............ | B65G 39/10 |
| | | | | | | 198/825 |
| 3,647,049 | A | * | 3/1972 | Hartzell, Jr. | ........... | B65G 15/42 |
| | | | | | | 198/711 |
| 3,701,411 | A | * | 10/1972 | McGinnis | .............. | B65G 15/56 |
| | | | | | | 198/303 |

(Continued)

FOREIGN PATENT DOCUMENTS

CN    201729487 U    2/2011
EP    2116488 A1    11/2009
(Continued)

OTHER PUBLICATIONS

Invitation to Pay Additional Fees and, Where Applicable, Protest Fee pertaining to International Patent Application No. PCT/US2016/020023.

(Continued)

*Primary Examiner* — Mark A Deuble
(74) *Attorney, Agent, or Firm* — Dinsmore & Shohl, LLP; Monika L'Orsa Jaensson, Esq.

(57) ABSTRACT

A concave conveyor belt idler system for use on the return run of a conveyor belt system, the idler being configured to maintain alignment of the belt and inherently adjust any misalignment thereof occurring during operation of the system. The concave conveyor belt idler system includes an elongated support member extending transversely of a conveyor belt return run and supporting a plurality of idler roller modules positioned such that the roller modules along the anterior side of the support member define a cave shape for supporting the conveyor belt, with the outer lateral edges at a lower elevation than the central portion of the conveyor belt. In a conveyor belt system the concave conveyor belt idler of the disclosed technology is positioned between two planate idler systems, on the return run, so that the center roller of the concave idler is in or near the plane of the belt as it traverses the planate idler systems, with the remaining rollers of the concave idler positioned below this plane.

15 Claims, 3 Drawing Sheets

(56) References Cited

U.S. PATENT DOCUMENTS

| | | | | |
|---|---|---|---|---|
| 3,863,752 | A * | 2/1975 | Sibley | B65G 21/14 198/303 |
| 4,234,078 | A * | 11/1980 | Nott | B65G 23/19 198/824 |
| 4,629,062 | A * | 12/1986 | Silverthorn | B65G 23/44 198/813 |
| 5,007,528 | A * | 4/1991 | Hideharu | B65G 15/60 198/823 |
| 5,222,594 | A * | 6/1993 | Sumino | B65G 15/08 198/807 |
| 5,373,935 | A * | 12/1994 | Anderson | B65G 39/12 198/808 |
| 6,394,262 | B1 | 5/2002 | Stoll et al. | |
| 7,614,493 | B2 * | 11/2009 | Dowling | B65G 39/16 198/806 |
| 2001/0013462 | A1 * | 8/2001 | Malmberg | B65G 39/16 198/836.3 |
| 2009/0260956 | A1 * | 10/2009 | Dunn | B65G 39/16 198/827 |

FOREIGN PATENT DOCUMENTS

| | | | |
|---|---|---|---|
| FR | 1435953 A | 4/1966 | |
| FR | 3008401 A1 * | 1/2015 | ............ B65G 39/16 |
| GB | 1033031 A | 6/1966 | |
| JP | H0249907 U | 4/1990 | |
| JP | H 101206 A | 1/1998 | |
| JP | H1129211 A | 2/1999 | |
| JP | 3211023 B2 | 9/2001 | |
| JP | 2009057205 A | 3/2009 | |
| JP | 2011255990 A | 12/2011 | |
| WO | 0222474 A1 | 3/2002 | |

OTHER PUBLICATIONS

International Search Report and Written Opinion of the International Searching Authority, Oct. 27, 2016, issued by the International Searching Authority in related PCT Application US2016020023.

* cited by examiner

RETURN BELT TRACKING IDLER FOR CONVEYOR BELT SYSTEM

BACKGROUND

The disclosed technology relates to belt-type conveyor systems, and more particularly to belt aligning idlers on the return run of conveyor systems which carry bulk materials, such as for carrying crushed stone, gravel, coal and the like.

In known conveyor systems for carrying bulk materials, upper runs of conveyor belts are supported on a series of conveyor belt idlers and other structures. On the return run of the belt, conveyor systems typically support the conveyor belts on planate conveyor belt idlers having a plurality of rollers, and other structures. In operation, the belt will frequently misalign on the return run due to loading and unloading of bulk materials on the upper run, and wear and misalignment of the system's rollers and their support structures over time.

Belt trainers have been developed and incorporated into belt idlers to detect and realign a misaligned conveyor belt on the return run. In some systems an edge roller detects the misalignment, and upon detection the system skews an idler or roller to realign the belt. However, in many of these systems the belt is significantly misaligned before the idler is skewed, causing premature belt and system wear. Furthermore, to quickly address the misalignment the system frequently over-adjusts the idler or roller, or maintains the adjusted position for too long, so that belt misaligns in the opposite direction, forcing the system to realign the belt again.

A need exists for an improved alignment system that maintains a conveyor belt in alignment on the return run of the conveyor system, and by its design and configuration inherently adjusts any misalignment of the conveyor belt, thereby reducing belt wear and loss of operating time, and increasing safety about the conveyor system.

SUMMARY OF THE TECHNOLOGY

The disclosed technology provides a conveyor belt idler for use on the return run of a conveyor belt system, the idler being configured to maintain alignment of the belt on the return run, and to inherently adjust any misalignment thereof occurring during operation of the system without skewing the idler or rollers.

The conveyor belt idler of the disclosed technology comprises an elongated support member affixed to and supported by the frame of the conveyor belt system, extending transversely of a conveyor belt return run and supporting one or more rollers. The support member has a top surface or flange, opposing lateral edges at its ends and longitudinal edges on the anterior and posterior sides thereof. To decrease the height profile of the idler, in some embodiments the rollers are supported on the side(s) of the support member.

The support member includes support structure to support the rollers on the anterior side of the support member, some of the rollers being provided at an angle relative to horizontal so that the rollers define a concave shape relative to the remainder of the conveyor belt return run. The support structure may be configured with a downward concave shape to support the rollers along the side of the support member. The support member may likewise be configured with a downward concave shape so that when positioned within the return run of a conveyor system the outer lateral edges of the support member are spatially positioned at a lower elevation than the central portion of the conveyor belt as it passes over the planate idler systems on the return run.

In some embodiments the support member further comprises support structure to support one or more rollers on the posterior side of the support member; these roller(s) may be provided at an angle relative to horizontal equal to or less than the angle of rollers similarly positioned along the anterior side of the support member, to partially or wholly continue the concave run of the belt as it travels through the idler of the disclosed technology.

The elongated support member may be affixed to and supported by the frame of the conveyor belt system by means of, for example, mounting feet extending from each end of the support member to allow removable affixation thereof, by bolts or similar structure, to the conveyor belt system frame.

In some embodiments some or all of the rollers are provided as idler roller modules, which modules may be supported at the side(s) of the elongated support member. Rollers or roller modules suitable for use on the disclosed technology may each comprise a central shaft defining a longitudinal axis of rotation to support the roller and allow it to rotate about the longitudinal axis of the shaft.

Roller modules may further include a frame for supporting the central shaft, wherein the frame includes first and second end plates having apertures engaging opposing first and second ends of the central shaft, and one or more support shafts or other structure affixed to and extending between the first and second end plates, parallel to the longitudinal axis of the central shaft. By providing each roller module with an individual pair of end support plates and support shafts, each roller module may be supported completely independently of the other roller modules.

Roller modules may further include attachment structure to facilitate removable attachment of the module to the support structure of the elongated support member. For example, attachment structure may extend from or be affixed to each first and second end plate, wherein the attachment structure may be a recess sized and configured to receive the support structure of the elongated support member.

Suitable roller modules for use in the disclosed technology include rubber-shell roller assemblies used in Richwood Industries' Cushion Arc® impact idlers, and described in U.S. Pat. No. 6,394,262, issued May 28, 2002, titled "Impact Idler Roller System for Conveyor Belt", the teachings and disclosure of which is incorporated by this reference. These roller assemblies may be modified for purposes of the disclosed technology, such as for example in its attachment structure facilitating removable affixation to the support structure of the elongate support member.

In some embodiments of the system of the disclosed technology roller modules are mounted on the anterior side of the elongated support member by sliding the modules, at the recess of their attachment structure, onto the support structure of the anterior side of the support member, and positioning the roller modules across the support member in end-to-end abutting engagement with each other, creating a nearly smooth arc. Roller modules may also be similarly mounted to the posterior side of the support member by sliding the modules at their recessed attachment structure onto the support structure of the posterior side of the support member, and securing the modules near the respective ends of the support member.

In a conveyor belt system the concave conveyor belt idler of the disclosed technology is positioned between two planate idler systems, on the return run, so that the center roller of the concave idler is parallel with the plane of the belt as it traverses over the planate idlers, with the remaining rollers of the concave idler positioned below the same plane. The concave idler may be positioned relative to the planate idlers so that the belt runs on top of the rollers of the planate idlers, but underneath the rollers of the concave idler of the disclosed technology.

By this design and configuration of the system of the disclosed technology, and the concave positioning of the rollers as herein described, belt tension increases from the center of the belt to its outer-most edges. In operation, as a belt begins to misalign on the return run, with one end moving out towards the conveyor system edge as the belt traverses the concave idler of the disclosed technology, tension increases on this edge of the belt. Because conveyor belts are anisotropic, they have a natural tendency to seek the place of lowest tension. Therefore, as the tension increases on the misaligning side of the belt, due to the design and configuration of the system of the disclosed technology the belt will naturally move towards an area of lower tension (the center of the belt), intuitively moving itself back into alignment without the need to adjust the idlers or rollers of the conveyor belt system.

DETAILED DESCRIPTION OF THE TECHNOLOGY

Figure 1:
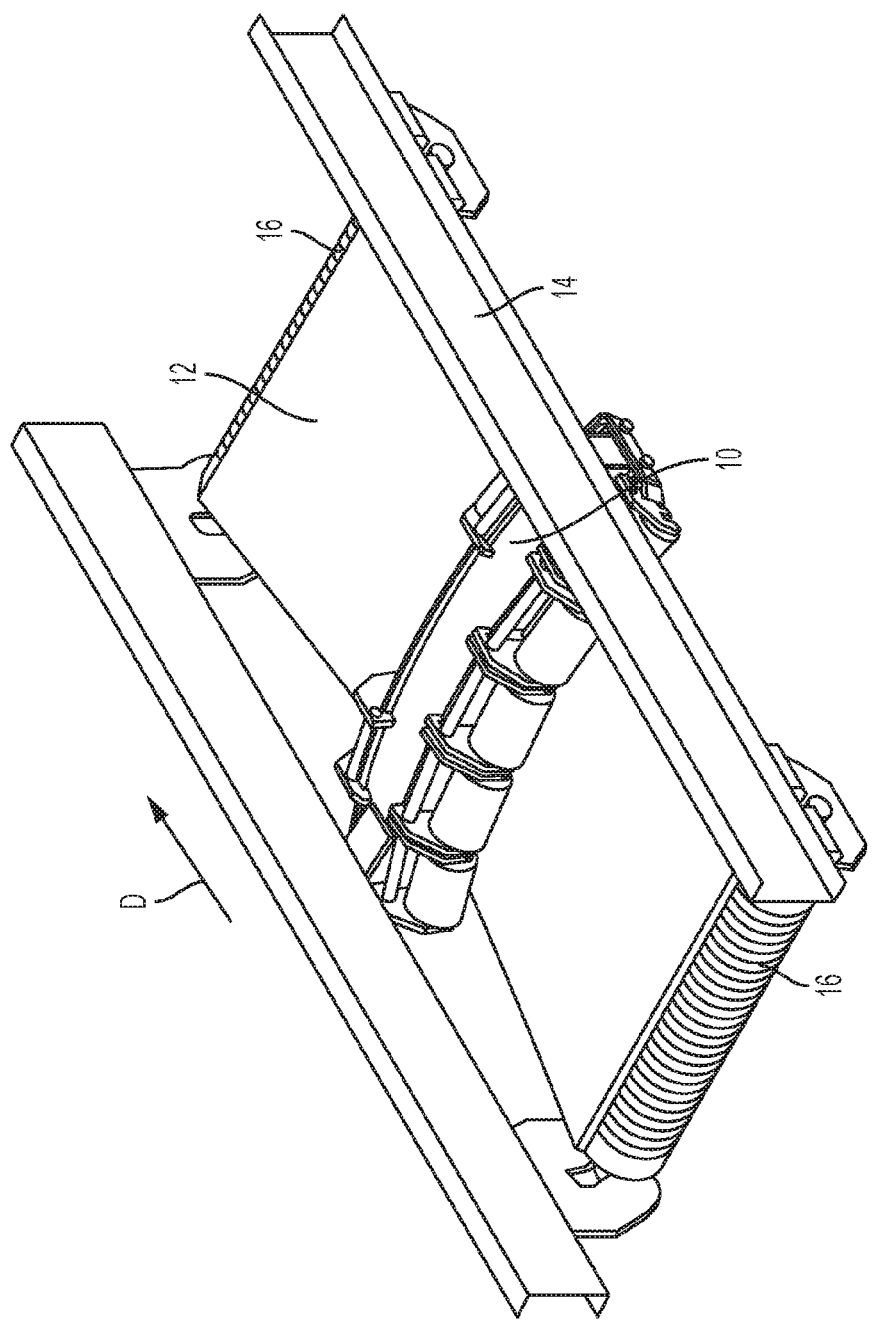
FIG. 1 is a perspective view of a portion of a conveyor belt system incorporating an embodiment of the disclosed technology.

Referring initially to FIG. 1, the disclosed technology provides a concave conveyor belt idler system 10 for use with a conveyor belt 12 for intuitively maintaining alignment of the belt on the return run of a conveyor belt system, and to inherently adjust any misalignment thereof occurring during operation of the system. The return run of the conveyor system includes a plurality of planate conveyor belt idlers 16 and one or more concave idlers 10. In the embodiment shown, the concave idler is positioned between two or more planate idlers.

Figure 2A:
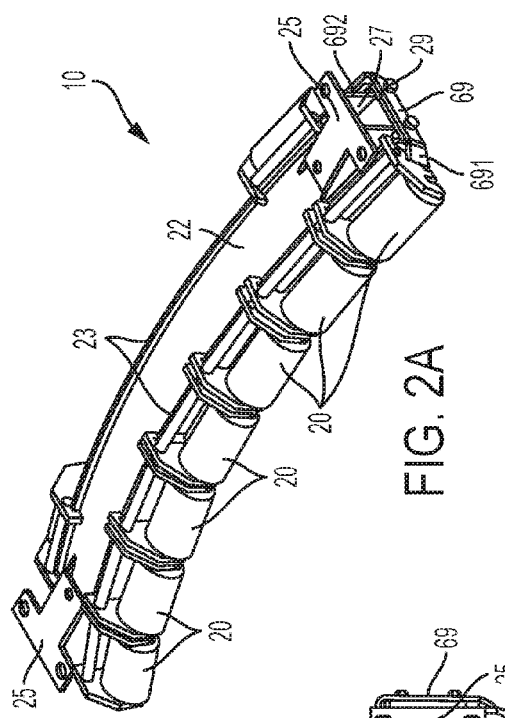
FIGS. 2A, 2B and 2C are perspective, top and front views, respectively, of an embodiment of the return concave idler roller system of the disclosed technology.
Figure 2B:
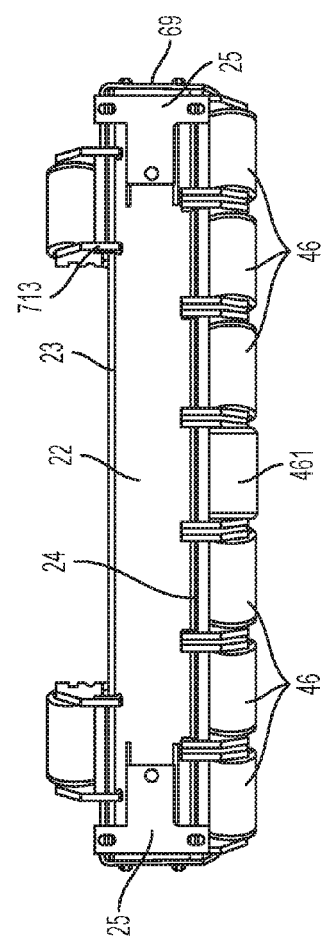
Figure 2C:
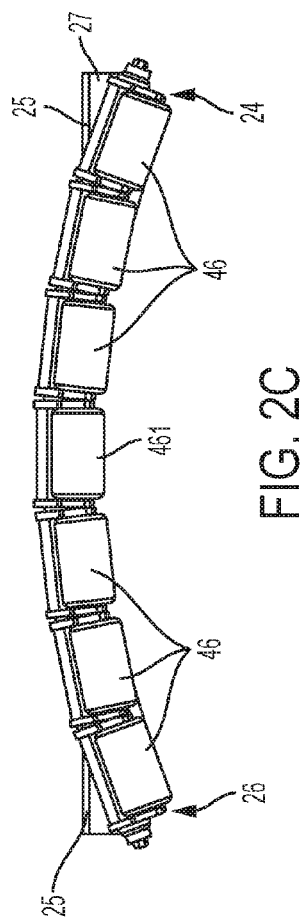

Referring to FIGS. 2A, 2B and 2C, the concave conveyor belt idler system 10 includes a plurality of rollers 46 which are directly or indirectly supported on an elongated support member 22, wherein the support member 22 defines a substantially rigid support structure extending transversely of the direction of travel D of the conveyor belt 12. The support member 22 may comprise one or more elongated flanges; when the support member includes a plurality of flanges, the flanges may be interconnected by webs, affixed perpendicular to the flanges, to form for example an I-beam. The support member 22 may further include means to mount the support member 22 to a conveyor belt system frame 14 by, for example, a pair of mounting feet 25 extending from the top flange of the support member, near the end regions, and supported by a gusset 27 or similar structure.

The support member 22 has one or more support structures 23 to support the rollers. The support structures 23 may be provided at or near the anterior and posterior sides of the support member 22. In some embodiments the support structures 23 are rails formed with a downward curvature, with the outer lateral ends 24, 26 of each support structure 23 being at a lower elevation than the support structure's center section. In some embodiments the top flange of the support member 22 is provided with a similar curvature; the web(s) and other flanges of the support member may be likewise curved. In some embodiments, as shown in FIGS. 2A, 2B and 2C, the support structures 23 are affixed partially abutting the sides of the support member 22, wherein an upper portion of the support structure extends above the plane of the surface of the top flange of the support member. In other embodiments the support structure 23 may be defined by an upper and lower portion, being affixed to a longitudinal edge of the support member at the region between the upper and lower portion, creating voids between the upper and lower portions of the support structure and the longitudinal edge of the support member.

The idler system of the disclosed technology is provided with a sufficient number of rollers 46 (for example, three to seven, or more), supported on the anterior side of the support member 22 to provide a continuous contour curve for supporting the belt 12. The curvature may be defined by a trough angle of between about 5° to 35°, or about 12° to 25°, whereby formation of sharp creases in the conveyor belt 12 as it passes over the concave idler 10 are avoided; in some embodiments the trough angle is 20°.

In some embodiments one or more rollers are supported near each end of the posterior side of the support member. These rollers on the posterior side may be provided or supported at an angle corresponding to or less than the angle of rollers similarly positioned on the anterior side of the support member. In the embodiment shown in FIGS. 2A, 2B and 2C, each roller is laterally positioned along the posterior side of the support member so that the center of the roller is generally aligned with the point of abutment of the two outermost rollers supported on the anterior side of the support member.

Figure 3:
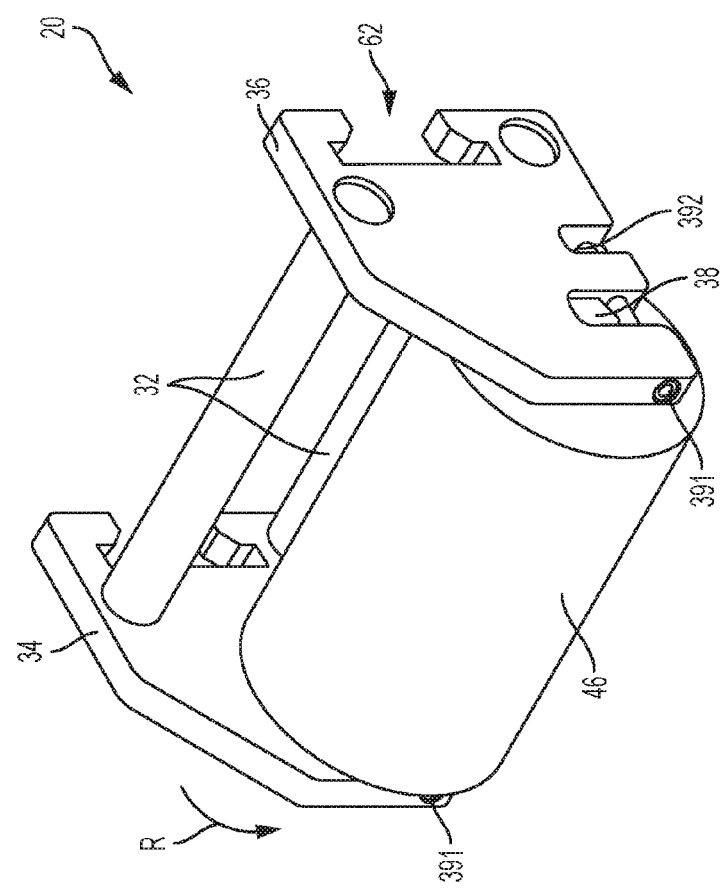
FIG. 3 is a perspective view of an embodiment of a roller module of the disclosed technology.

The rollers 46 of the concave idler may be provided as roller modules 20. Referring to FIG. 3, an embodiment of a roller module 20 suitable for use in the disclosed technology includes a frame 30 having one or more support shafts 32 and upwardly extending first and second end plates 34 and 36 rigidly connected to opposing ends of a support shafts 32. As shown in FIG. 3, the support shafts 32 may be affixed to upper and lower rear portions of the end plates 34, 36, by for example extending in or through receiving apertures in each plate.

A central shaft 38 extending through the end plates 34, 36, defines a longitudinal axis of rotation R for the roller 46. The central shaft 38 includes first and second ends supported within securing apertures defined in the respective first and second end plates 34, 36. The center portion of the central shaft 38 may be cylindrical in cross-section, allowing the roller 46 to rotate about the shaft 38, while the ends may have a cross-sectional shape of a truncated circle or other oblong shape. The roller 46 may thereby be supported for rotation on the shaft 38. Rollers suitable for use in the disclosed roller modules may have a diameter of between about 3" and 5", or about 4".

In some embodiments of the disclosed technology the central shaft 38 of the roller module is removably secured in the securing apertures of the corresponding end plates 34, 36 by means of, for example, bolts 391 and nuts 392, as shown in FIG. 3. In this embodiment each bolt 391 traverses through an aperture extending longitudinally through the end plate 34, 36, through and beyond the securing aperture. Each of the bolts may be secured to the plate by rotating a nut 392 onto the threaded end of the bolt, wherein access to the threaded end of the bolt is provided by a recess extending through the sides of the plates 34, 36. The securing apertures may have a width smaller than the larger diameter of the truncated circle cross section of the end of the shaft 38, and may have a top section sized and shaped to receive the top (or bottom) of the shaft, so that the shaft does not rotate within the receiving aperture when secured therein. By this configuration the central shaft 38 is removably secured to the frame 30, and rollers may be easily changed as they wear over time.

Each of the end plates 34 and 36 includes an attachment structure defined in an embodiment by a recess 62, as shown in FIG. 3. Each recess 62 generally defines a profile suitable for receiving the support structure 23, in its configuration; in some embodiments this may be a generally t-shaped profile. As hereinabove described, the support structure 23 may be provided for engaging within the attachment structure of a roller module, and in some embodiments is provided as an upwardly or outwardly extending rail for inter-engaging with the recess 62. The mounting of the support structure 23 on the support member 22 provides a sliding mounting for the rollers 46 or roller modules 20, wherein the roller modules are mounted to the support member 22 by sliding the modules 20 at their attachment structure onto either end 24, 26 of the support structure 23. In an embodiment, five to seven roller modules 20 are provided on the support member 22, although more or less roller modules may be provided depending on the length of the support member 22 and the width of the conveyor belt 12.

The rollers 46 or roller modules 20 may be secured to the anterior side of the support structure 23 of the support member 22, by removable end retainer structures 69, affixed to each end of the support member 22 by means of bolts and a bolting bar 29. The bolting bar 29 is provided at each end of the support member 22, with apertures to receive the bolts for removably securing the end retainer structures 69. When the rollers or roller modules are positioned on the support structure 23, each removable end retainer structures 69 may be bolted to the bolting bar 29 at each end of the support member 22. As shown in FIGS. 2A, 2B and 2C, each end retainer structure 69 may comprise a crossbar with an extending end retainer clip 691, provided at an angle at a first end of the crossbar to secure the peripheral rollers 46 or roller modules 20 positioned on the anterior side of the support member. In some embodiments the end retainer structure 29 may further include a retaining bar 692, extending perpendicularly from the other end of the crossbar to secure the rollers 46 or roller modules 20 positioned on the posterior side of the support member. When rollers 46 or roller modules 20 are installed on the posterior side of the support member 22, fewer than necessary to extend the length of the support member, the support member 22 may further include stop bars 713, extending along the posterior side of the support member 22 to inhibit lateral movement of the rollers 46 or roller modules 20 beyond their desired position.

In a conveyor system, as shown in FIG. 1, the concave conveyor belt idler 10 of the disclosed technology is positioned between two planate idler systems 16, so that the bottom of the center roller 461 of the concave idler is in or near the plane of the belt as it traverses over the planate idler systems, with the remaining rollers 46 of the concave idler 10 positioned below the same plane, providing a smooth transition between the concave conveyor belt idler system 10 and the adjacent planate conveyor belt idlers 16. In this configuration the idler system 10 may be equidistant from two planate idlers. In some embodiments, the distance between the concave idler system 10 and a planate idler structure is about 5' to 10', although other separation distances may be appropriate depending on the tension and size of the belt 12 and the conveyor system.

In view of the above description, it can be seen that the disclosed technology provides a concave conveyor belt idler roller system for use on the return run of a conveyor belt system, which provides for extended roller life as a result of the combined beneficial effects of maintaining alignment of the belt, thereby reducing belt wear and loss of operating time, and increasing safety about the conveyor system.

While the form of apparatus herein described constitutes a preferred embodiment of this technology, it is to be understood that the invention is not limited to this precise form of apparatus, and that changes may be made therein without departing from the scope of the invention that is defined in the appended claims. It should be noted that reference to affixation of components as herein described may refer to welding of material, bolting or rolling/extruding, or any other means to removably or fixedly join two components into a single structure.

What is claimed is:

1. An idler roller system for the return run of a conveyor belt system, said idler roller system comprising:
   a. an elongated support member having a first side and a second side, and comprising a concave support structure; and
   b. a plurality of rollers designed and configured to be affixed to the first side of the elongated support member, at the support structure, wherein the rollers are provided as roller modules, each roller module comprising a frame having one or more support shafts, upwardly extending end plates rigidly connected to opposing ends of the support shafts, and a central shaft removably affixed to the end plates and supporting the roller for rotation about its longitudinal axis.

2. The idler roller system of claim 1, wherein the elongated support member is concave.

3. The idler roller system of claim 1 wherein the system further comprises a plurality of rollers designed and configured to be affixed to the second side of the elongated support member.

4. The idler roller system of claim 3, wherein at least some of the rollers on the first side are positioned at an angle relative to horizontal, and wherein the rollers removably affixed to the second side of the elongated support member are at an angle relative to horizontal equal to or less than the angle of rollers similarly positioned along the first side of the support member.

5. The idler roller system of claim 1, wherein the end plates of the roller modules further comprise a recess sized and configured to receive a portion of the support structure.

6. The idler roller system of claim 1, wherein
   a. the central shaft comprises first and second ends supported within securing apertures defined in the respective first and second end plates, wherein the center portion of the central shaft is cylindrical in cross-section, and the ends of the central shaft have an oblong cross-sectional shape, and
   b. the securing apertures have a width smaller than the larger dimension of the cross-sectional oblong shape of the ends of the central shaft.

7. The idler roller system of claim 6, wherein the end plates of the roller module each comprises an aperture extending longitudinally through a portion of the end plate and the securing aperture, to receive a bolt.

8. An idler roller system for the return run of a conveyor system having a belt which traverses the conveyor system in a direction, said idler roller system comprising an elongated support member having an anterior side and posterior side relative to the direction of the conveyor belt as it traverses the conveyor belt system, and a plurality of rollers, wherein the system when assembled supports the rollers on the anterior side of the elongated support member, in a shape that is concave to the return run of the belt of the conveyor system, wherein the rollers are provided as roller modules, and the roller modules are secured to the anterior side of the support member by means of at least one removable end retainer structure, the removable end retainer structure being removably affixed to an end of the support member, the end retainer structure comprising a crossbar with an extending end retainer clip, wherein the extending end retainer clip is provided at an angle at a first end of the crossbar.

9. The idler roller system of claim 8, wherein the system when assembled further supports rollers on the posterior side of the elongated support member, at angles corresponding to similarly positioned rollers on the anterior side of the elongated support member, and wherein the removable end retainer structures further comprises a retaining bar, extending perpendicularly from a second end of the crossbar.

10. The idler roller system of claim 9, wherein the elongated support member further comprises a pair of stop bars on the posterior side of the support member.

11. A conveyor system comprising a belt designed and configured to traverse the conveyor system in a direction, a plurality of planate idler roller systems and a concave idler roller system, the concave idler roller system comprising a plurality of rollers supported in a shape that is concave, wherein the concave idler roller system is positioned between two planate idler roller systems, wherein the rollers are provided as roller modules, each roller module comprising a frame having a pair of upwardly extending end plates and a central shaft supported for rotation of the roller about the central shaft, and wherein the concave idler roller system comprises a support member having an anterior side and a posterior side relative to the direction of the conveyor belt as it traverses the conveyor system, and wherein the roller modules are secured to the anterior side of the support member by means of at least one end retainer structure, the end retainer structure being removably affixed to an end of the support member, and comprising a crossbar with an extending end retainer clip, wherein the extending end retainer clip is provided at an angle at a first end of the crossbar.

12. The idler roller system of claim 11 wherein the roller modules are further supported on the posterior side of the support member, at angles corresponding to similarly positioned rollers on the anterior side of the support member, and wherein the end retainer structure further comprises a retaining bar, extending perpendicularly from a second end of the crossbar.

13. The conveyor system of claim 11, wherein the bottom surface of a center roller of the concave idler roller system is parallel with a plane of the belt as it traverses over the planate idler roller systems, with the remaining rollers of the concave idler roller system is at least partially positioned below the same plane.

14. The conveyor system of claim 11, wherein the concave idler roller system is positioned relative to the planate idlers, so that in operation the belt runs on top of the rollers of the planate idler roller system, but underneath the rollers of the concave idler roller system.

15. A conveyor system comprising a belt, a plurality of planate idler roller systems and a concave idler roller system, wherein the concave idler roller system is positioned between two planate idler roller systems, the conveyor system comprising a system frame, to support the planate idler roller system and the concave idler roller system, wherein the concave idler roller system comprises a plurality of rollers supported in a shape that is concave and a support member with a top flange, having a pair of mounting feet extending from the top flange, each of the mounting feet supported by a gusset affixed to the top flange of the support member.

* * * * *